(12) United States Patent
Ali et al.

(10) Patent No.: US 9,141,192 B2
(45) Date of Patent: Sep. 22, 2015

(54) INTERACTIVE DIGITAL CATALOGS FOR TOUCH-SCREEN DEVICES

(71) Applicants: Arish Ali, San Francisco, CA (US); Daniel Kowta, San Francisco, CA (US)

(72) Inventors: Arish Ali, San Francisco, CA (US); Daniel Kowta, San Francisco, CA (US)

(73) Assignee: KALLIDUS, INC., San Francisco, CA (US)

( * ) Notice: Subject to any disclaimer, the term of this patent is extended or adjusted under 35 U.S.C. 154(b) by 153 days.

(21) Appl. No.: 13/839,831

(22) Filed: Mar. 15, 2013

(65) Prior Publication Data

US 2014/0129932 A1   May 8, 2014

Related U.S. Application Data

(60) Provisional application No. 61/664,706, filed on Jun. 26, 2012.

(51) Int. Cl.
*G06F 3/048* (2013.01)
*G06F 3/01* (2006.01)
*G06Q 30/06* (2012.01)
*G06F 3/0488* (2013.01)

(52) U.S. Cl.
CPC ............. *G06F 3/016* (2013.01); *G06F 3/0488* (2013.01); *G06Q 30/0643* (2013.01)

(58) Field of Classification Search
CPC .................. G06F 17/30864; G06F 17/30867; G06F 17/30011; G06F 3/0486
See application file for complete search history.

(56) References Cited

U.S. PATENT DOCUMENTS

| | | | |
|---|---|---|---|
| 8,954,895 B1* | 2/2015 | Yaksick et al. | 715/863 |
| 2006/0026535 A1* | 2/2006 | Hotelling et al. | 715/863 |
| 2008/0172695 A1* | 7/2008 | Migos et al. | 725/45 |
| 2010/0099390 A1* | 4/2010 | Vendrow et al. | 455/414.1 |
| 2010/0289766 A1* | 11/2010 | Munekuni | 345/173 |
| 2011/0238524 A1* | 9/2011 | Green et al. | 705/26.7 |

* cited by examiner

*Primary Examiner* — William Bashore
*Assistant Examiner* — Rayeez Chowdhury
(74) *Attorney, Agent, or Firm* — Joseph S. Heino; Patrick M. Bergin (57) ABSTRACT

A computer implemented method, system and computer program product features "Info Dial UI," a degree-based and tactilely-initiated dialing gesture for providing product information to a user. This feature allows the user to tactilely control the amount of product information displayed to the user as the user tactilely moves an indicia along an arc. It also features a related "Circle a Product" feature. This method, system and computer program product provides the user with prompts and guidance for improving product purchases via mobile encoding technology and personal computing devices.

6 Claims, 13 Drawing Sheets

INTERACTIVE DIGITAL CATALOGS FOR TOUCH-SCREEN DEVICES

This Application claims the benefit of U.S. Provisional Application No. 61/664,706, filed Jun. 26, 2012.

FIELD OF THE INVENTION

This invention relates generally to the marketing and selling of products and services. It also relates generally to web-based (i.e. utilized by means of the virtual community that exists on the "internet" or within the "world wide web," or "www") methods and systems for acquiring, storing, processing, retrieving and displaying information and data. More specifically, the present invention relates to a method, system and software product that provides an enhanced electronic interactive digital catalog for touch-screen devices that allows users and consumers of various goods and services to search for and select suitable goods and services from purveyors. It also relates to a user-friendly and computerized platform for searching for and receiving information as to certain products sold via digital catalogs, such catalogs being available for use with touch-screen devices.

BACKGROUND OF THE INVENTION

Goods, and some services, have been sold through product catalogs for more than a century. In today's world of electronic data processing and communications, the internet provides consumers and sellers with promotional opportunities and benefits not previously made possible. This is particularly true for sellers who, up to now, have sold products and services only through paper catalogs, which are rapidly becoming a thing of the past. As in other retail sales areas, it is recognized by these inventors that consumers and retail sellers of various products and services are becoming more and more intrigued with the use of technology to aid in the search for compatible or suitable goods or services to be sold to the consuming public. However, using and searching presently-available websites of purveyors who advertise and sell such goods and services to consumers can be a very labor-intensive process.

In the view of these inventors, what is needed is a method, system and software product for providing much improved functionality of interactive digital catalogs for touch-screen devices. Indeed, electronic data processing, digital communication and tactile-actuated touch screen technologies make the method and system of the present invention possible. The present invention is also made possible by the use of specialized software that will allow consumers and retail sellers to access and utilize certain unique product selection formats, guides and search engines. The present invention provides consumers with a convenient and easy to use electronic platform for conducting electronic commerce via touch screen devices and further provides them with mobile capabilities for enhanced product selection.

SUMMARY OF THE INVENTION

In accordance with the foregoing, these inventors have perceived a need to provide such a method, system and software product where interactive digital catalogs, or catalog applications (or simply "apps"), can be provided for touch-screen devices, such as the iPad® brand tablet computer (iPad® is a registered mark of Apple Inc.), in an "on-line" or user interface (or "UI") format. It is to be understood, however, that the apps of the present invention could also be used with traditional personal computers and other personal computing devices. Such a method, system and software product will provide the user with a UI for navigating any number of such interactive digital catalogs and is accessible using mobile encoding technology and personal touch screen computing devices.

In accordance with the present invention, the inventors more specifically provide several unique features, or functionalities, as part of the enhanced catalog app which is the subject of the present application and will be disclosed herein. One feature will be identified as "Info Dial UI," which is a degree-based dialing gesture for providing additional information to the user. Closely related to the Info Dial UI concept is the "Circle a Product" feature.

The foregoing and other features of the method, system and software product of the present invention will become apparent from the detailed description that follows.

DETAILED DESCRIPTION

As a prefatory statement, it is to be understood that the method and system of the present invention assumes usage of a specific computer program product that is used within an electronic commerce (or "e-commerce") environment and that comprises certain system building block "components." Those components are data structures, data processors and interfaces, and each component is a functional element. The data structures are places to organize and store data. The data processors are used to manipulate data by performing processes or applying algorithms to the data. The interfaces connect the data structures and the data processors to the outside world, or to other data structures and data processors, including the virtual internet-based community that exists within the "world wide web" or "www." The program includes source code which is a list of instructions, written in a selected computer language, and then converted into computer machine language, which language the computer uses to build the software "machine" described by the instructions. The software machine is made up of the components referred to above. The source code is a detailed "blueprint" telling the computer how to assemble those components into the software machine. Further, the source code is organized into separate files, files are organized into separate modules, and modules are organized into separate functions or routines to accomplish, via pre-programmed algorithms, the necessary steps in accordance with the method and system of the present invention. It is to be understood that the specific way that the source code is organized into files, modules and functions is a matter of programmer design choice and is not a limitation of the present invention. It should also be understood that the method and system of the present invention is made possible by virtue of the existence of the internet. The internet offers opportunities and benefits that cannot be performed with the use of printed product catalogs or other more conventional promotional literature.

As mentioned earlier, one feature or functionality that is provided in accordance with the present invention is the "Info Dial UI" or "Info Slide Dial." The Info Slide Dial feature allows the user to control the amount of information the user gets via interaction with a user interface, which would be the display visualized by the user on the touch-screen device. This feature comprises a user interaction whereby the user slides his or her finger in a circular motion, or a degree-based dialing gesture, around a displayed product. See FIGS. 1A through 1G. The slide can be an arc that is partially circular or fully circular. When the user touches in or around a product, an animation will show the user that a gesture around the product will provide additional information to the user. In this fashion, the more the user's finger slides along an arc to, the more information the user obtains about the product from the display. Sliding in reverse reduces the amount of information already provided to the user. When the dial is fully circular, this is called "Circle a Product."

Figure 1A:
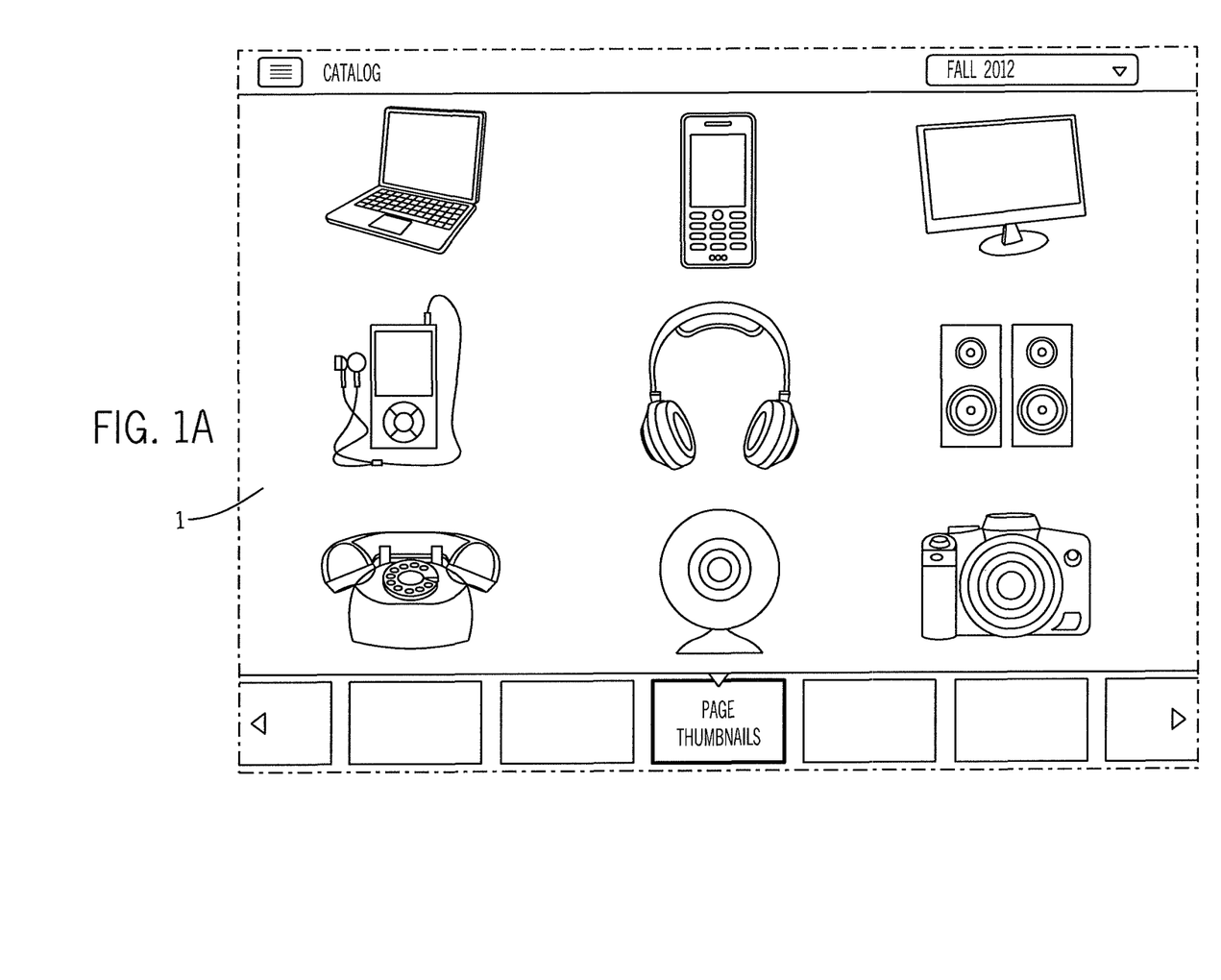
FIGS. 1A through 1G are exemplary screen displays on a touch screen device that is capable of processing mobile apps and illustrating the "Info Dial UI" functionality in accordance with the present invention.
Figure 1B:
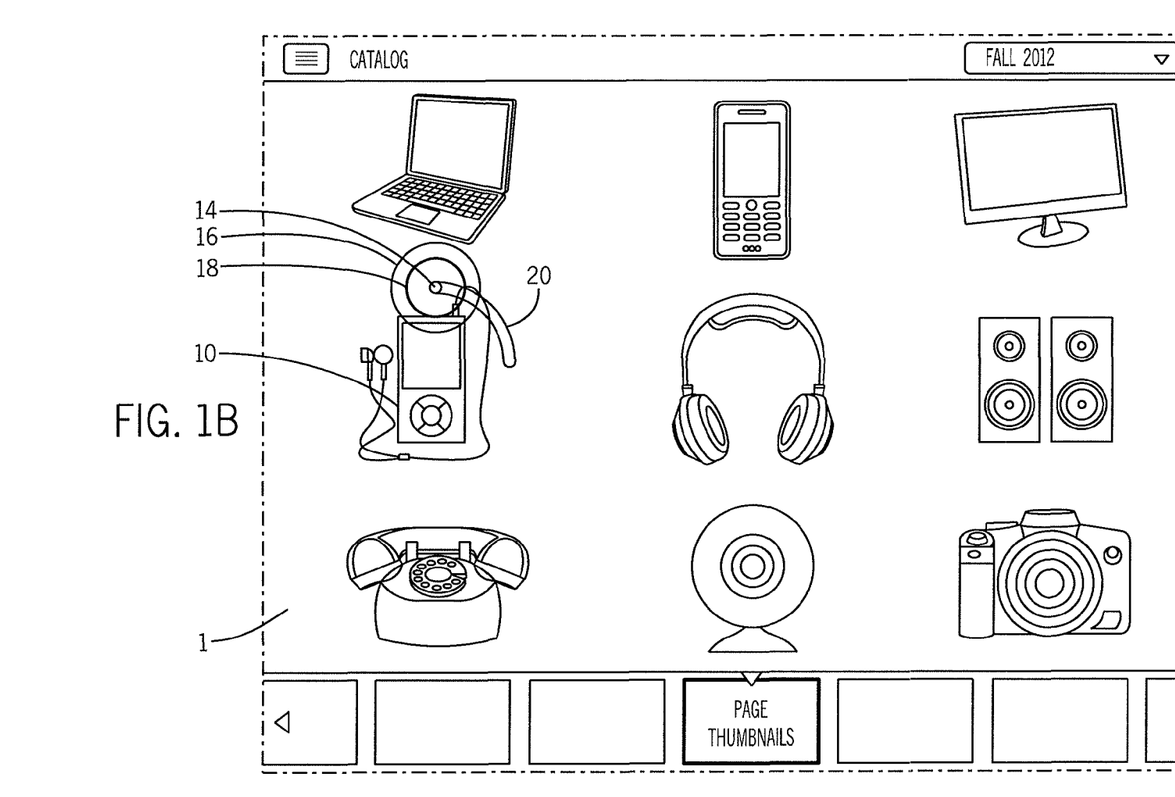

Referring specifically to FIG. 1A, it illustrates a touch-screen display (1) which screen display (1) includes images of several different products in its "default view." The exact type of product or item, or the use to which the product or item is put, is not a limitation of the present invention. For purposes of illustration only, the screen display (1) shown in FIG. 1B illustrates the image of a portable media player (10). When the user taps on the image (10) on the screen display (1) and then holds his or her finger down, the semi-transparent dial arc (20) will appear and that action further animates a first circle (16) and a second circle (18), both of which expand outwardly from a solid white dot (14). At this point, solid white dot (14) indicates the top portion of the arc (20). It is to be understood that the present invention is not limited to the use of a solid white dot (14) as any suitable visual indicia could be used with this functionality.

Figure 1C:
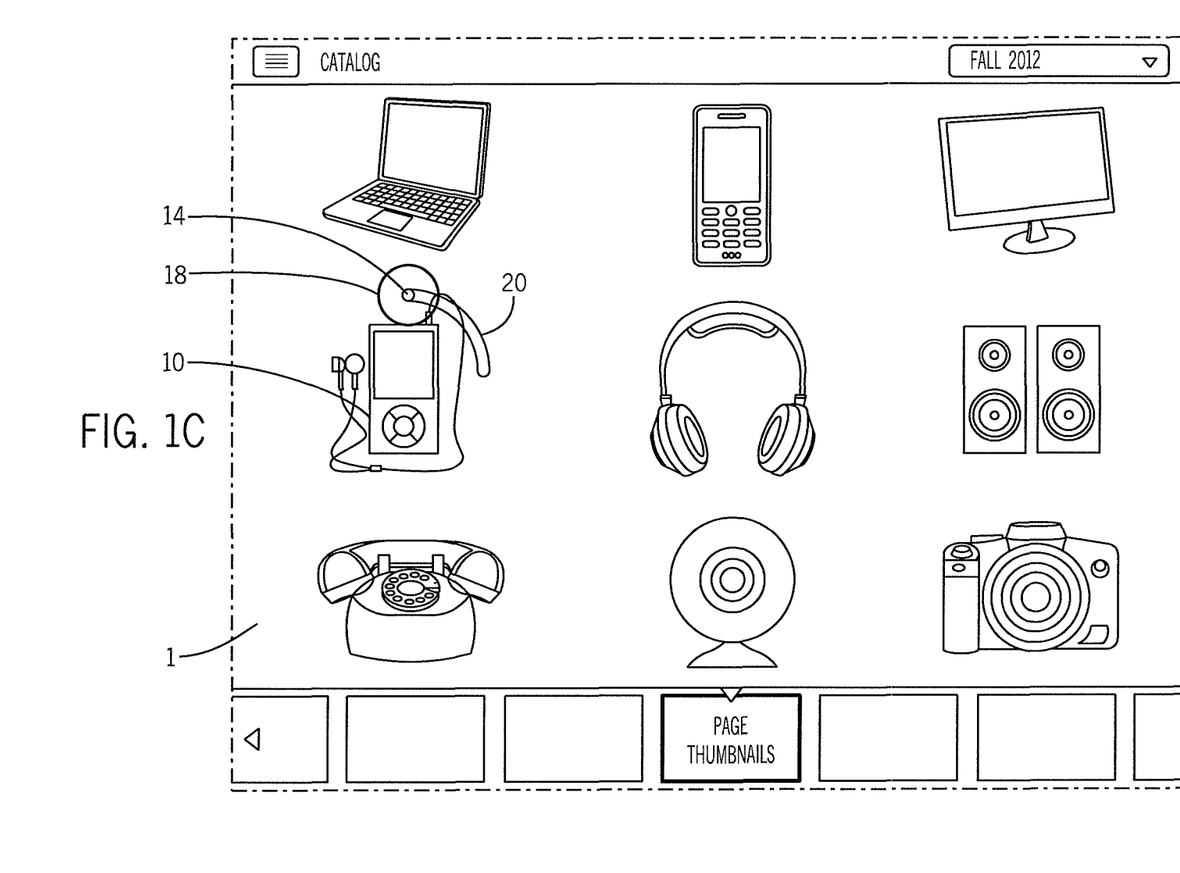
Figure 1D:
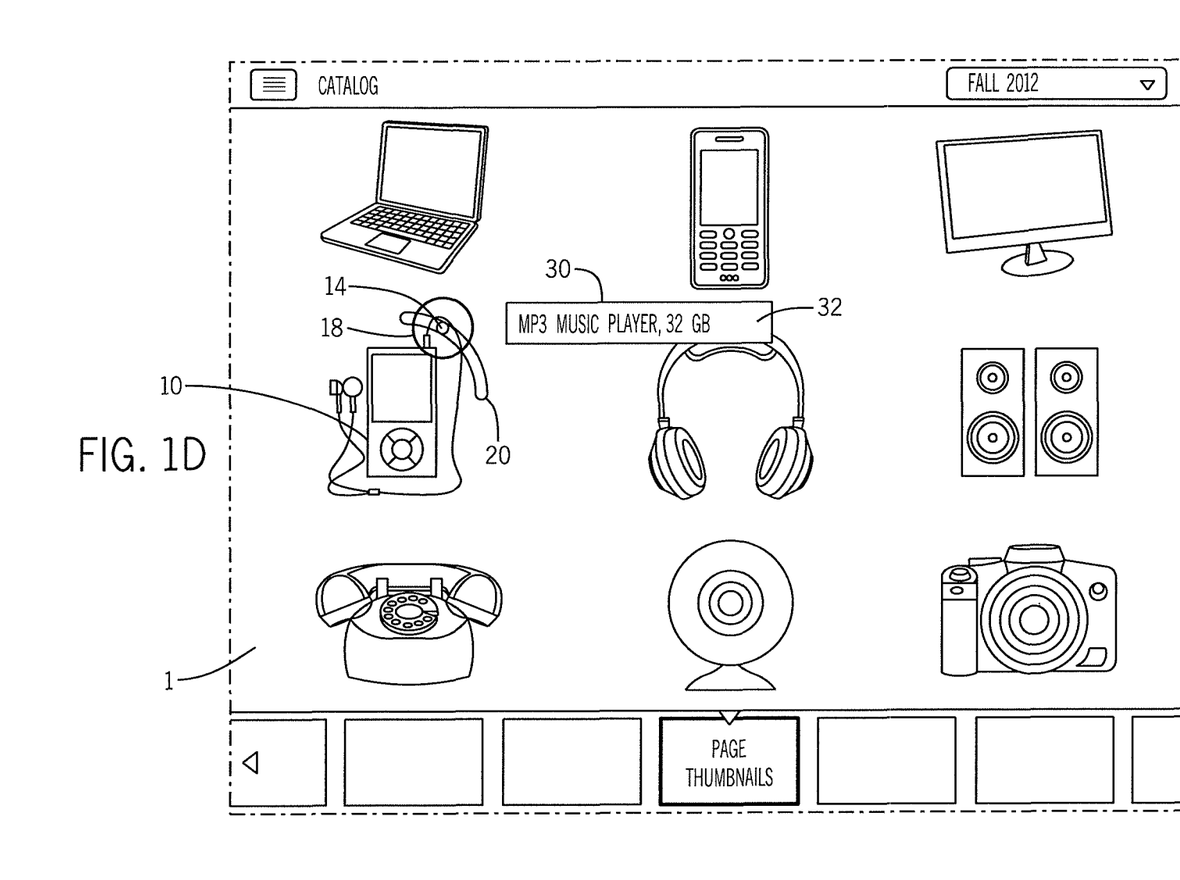
Figure 1E:
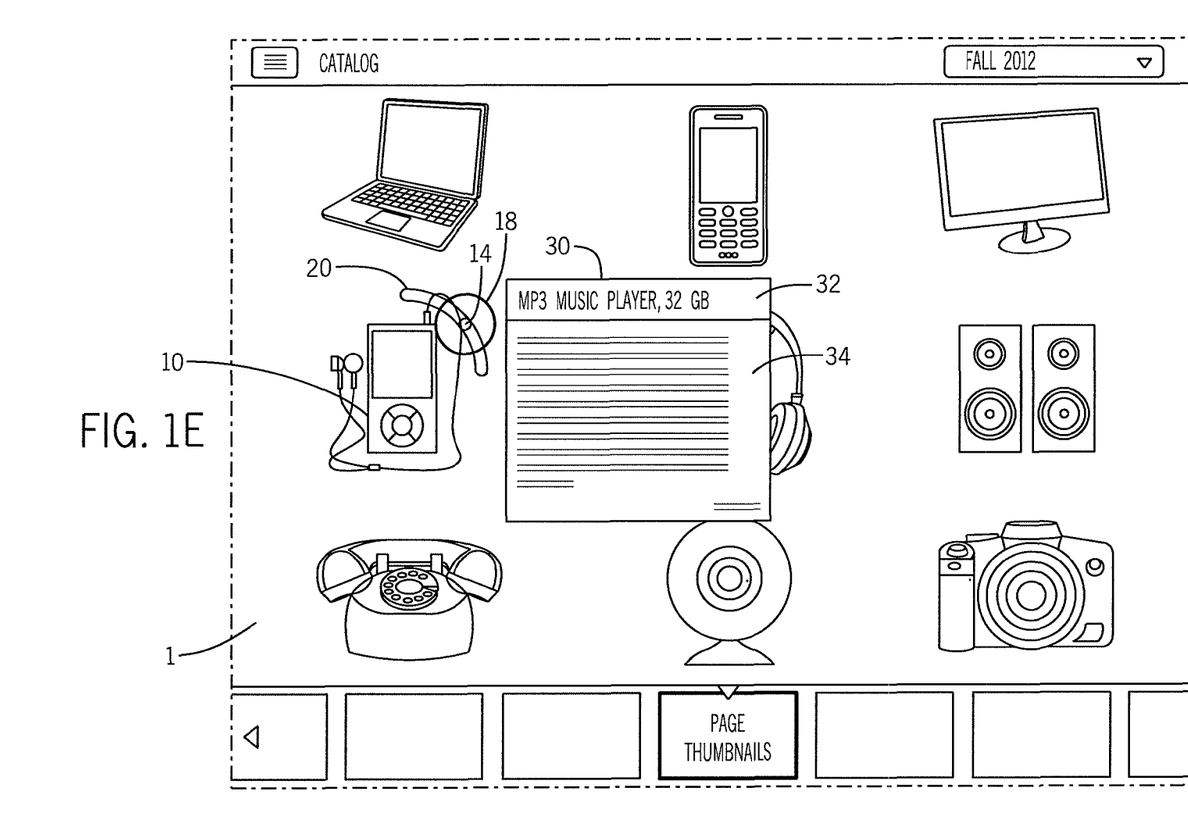
Figure 1F:
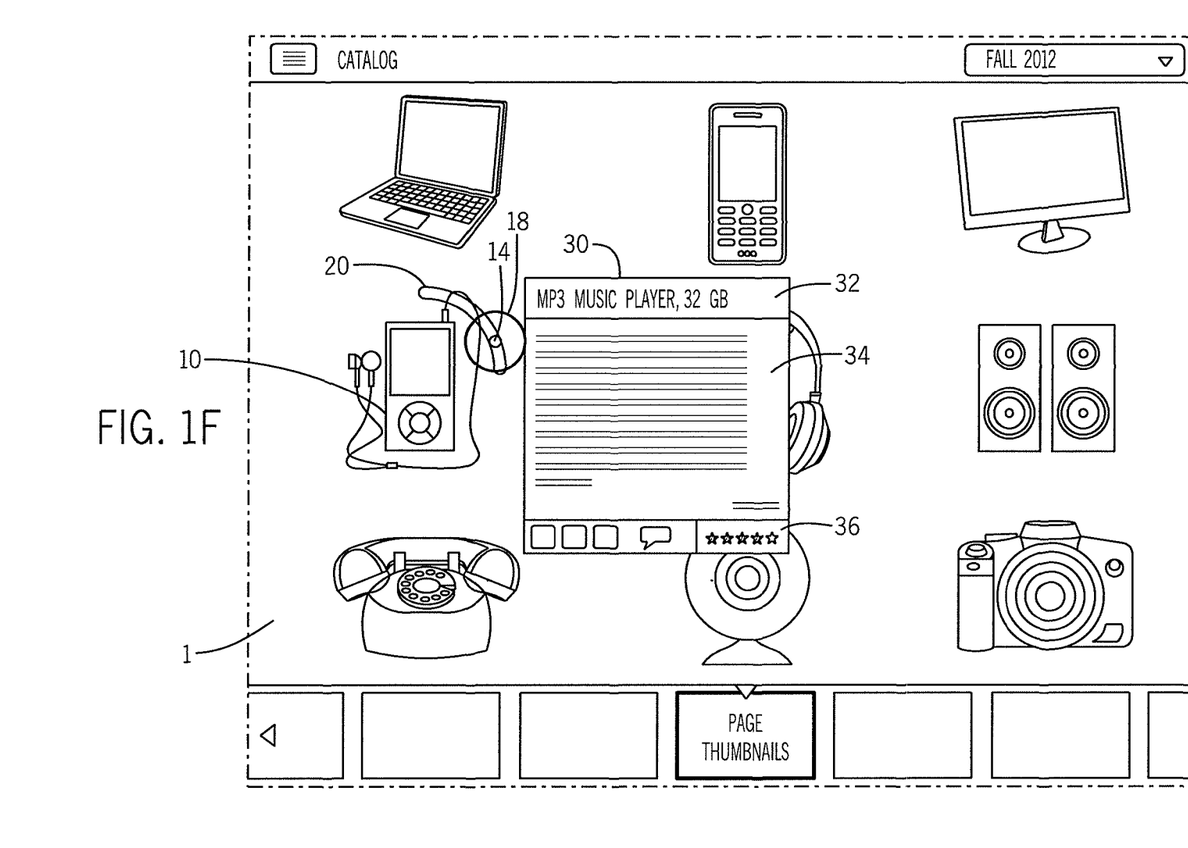
Figure 1G:
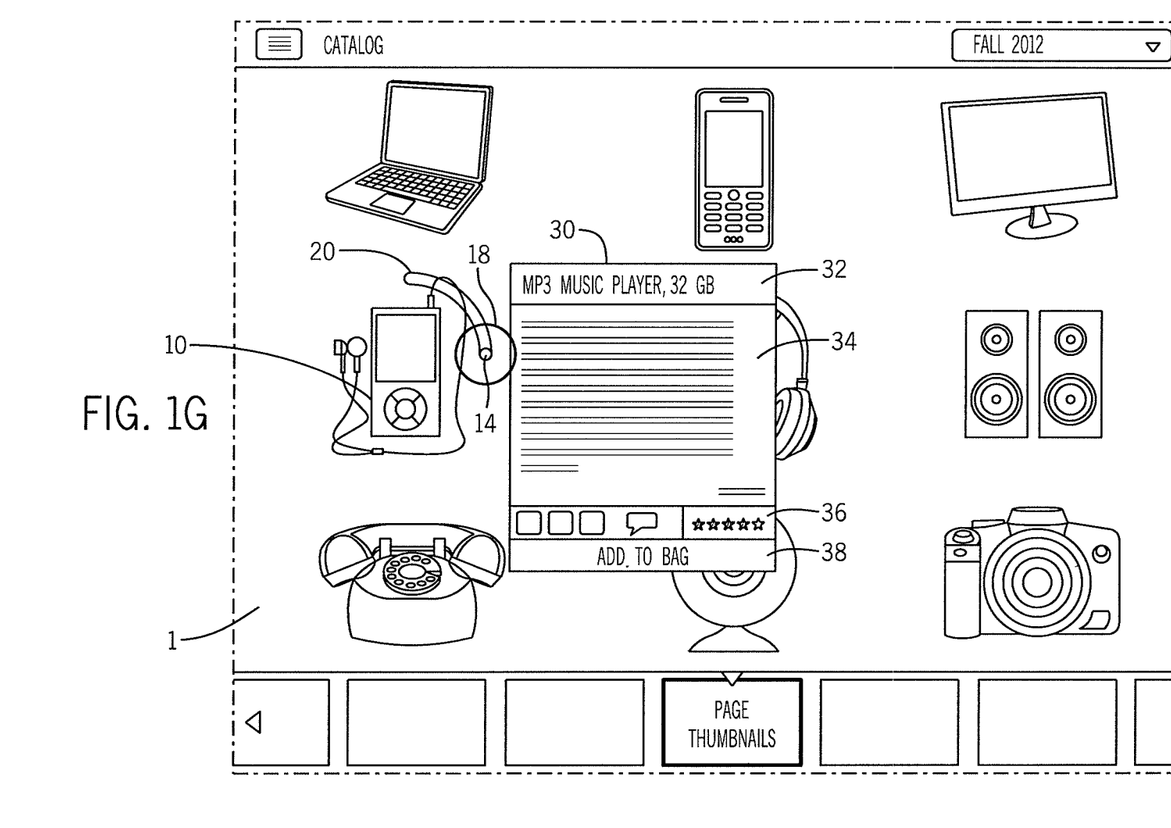

As shown in FIG. 1C, and after the first circle (16) fades or animates away, the second circle (18) continues to remain visible about the solid white dot (14). As shown in FIG. 1D, and as the user's finger tactilely slides the white dot (14) downwardly along the arc (20), the first portion (32) of an information (or "info") box (30) appears on the visual display (1). The first info box portion (32) shows, for example, the product's name by brand, model, etc. Continuing, FIG. 1E illustrates the screen display (1) where the user's finger is used to further slide the white dot (14) downwardly along the arc (20) such that a second portion (34) of the info box (30) appears. This second portion (34), as shown in the illustrative embodiment, contains a product description. FIG. 1F shows that, as the user's finger slides the solid white dot (14) still further downwardly along the arc (20), a third portion (36) of the info box (30) appears. That third info box portion (36) shows, for example, social interaction capabilities that are available to the user. Here again, the social interaction capabilities available to the user are not limited to only those shown in FIG. 1F.

As the user's finger slides the solid white dot (14) still further downwardly along the arc (20), a final box portion (38) appears. See FIG. 1G. In that final box portion (38), the user is invited to add the product to his or her virtual shopping bag. It should be mentioned here that the number of box portions of the info box (30) is not limited to the number presented here, which number is used solely for purposes of illustrating the "partially circular" functionality of expanding product information as the user tactilely moves the solid white dot (14), or other indicia, using his or her finger along the arc (20). It should also be mentioned that tapping anywhere on the touch-screen display (1) at any point that is off of the info box (30) will close the info box (30). Further, the user has the capability of tactilely sliding the solid white dot (14) using his or her finger upwardly along the arc (20) which will consecutively collapse or reduce the info box portions (32, 34, 36, 38) and show less information. Moving the solid white dot (14) upwardly will again open the info box portions (32, 34, 36, 38) as described above.

Figure 2A:
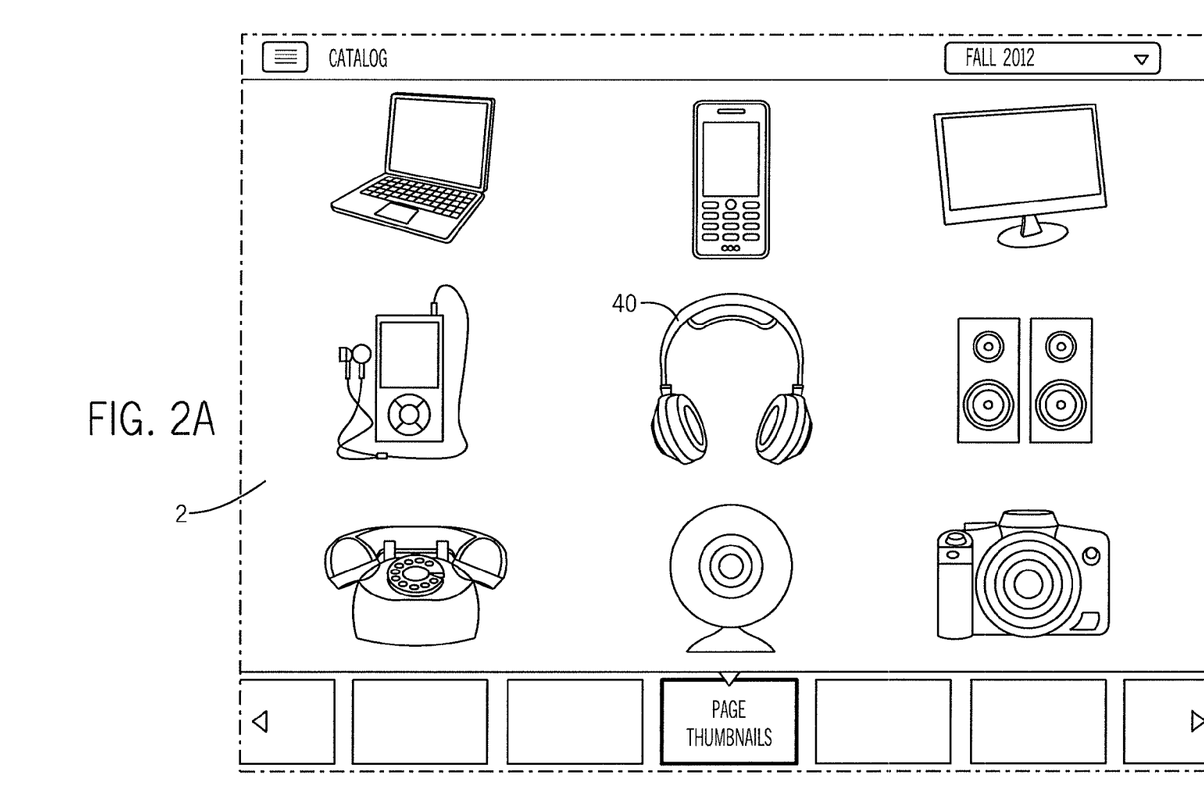
FIGS. 2A through 2F are similar exemplary screen displays that illustrate the "Circle a Product" functionality in accordance with the present invention.
Figure 2B:
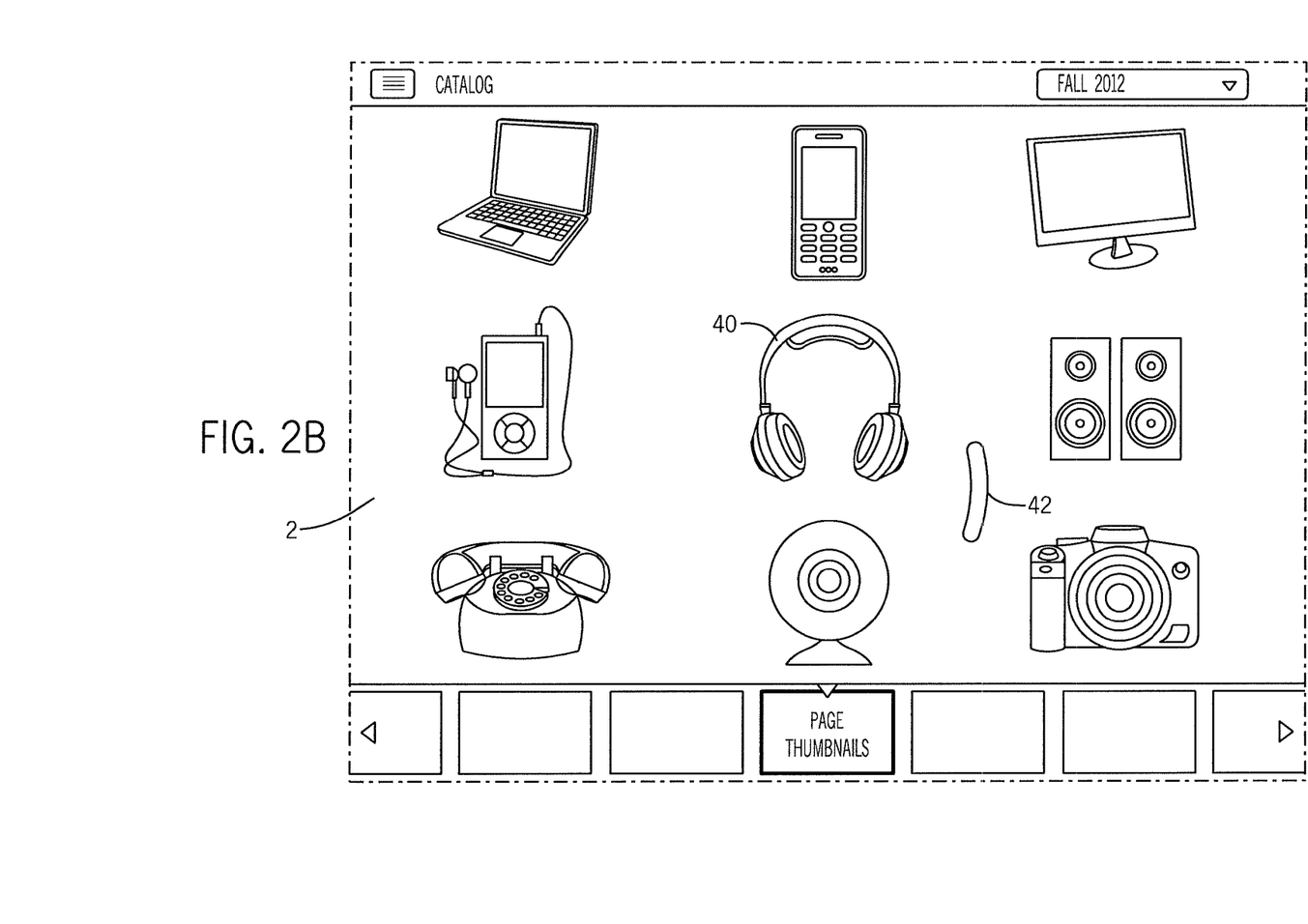
Figure 2C:
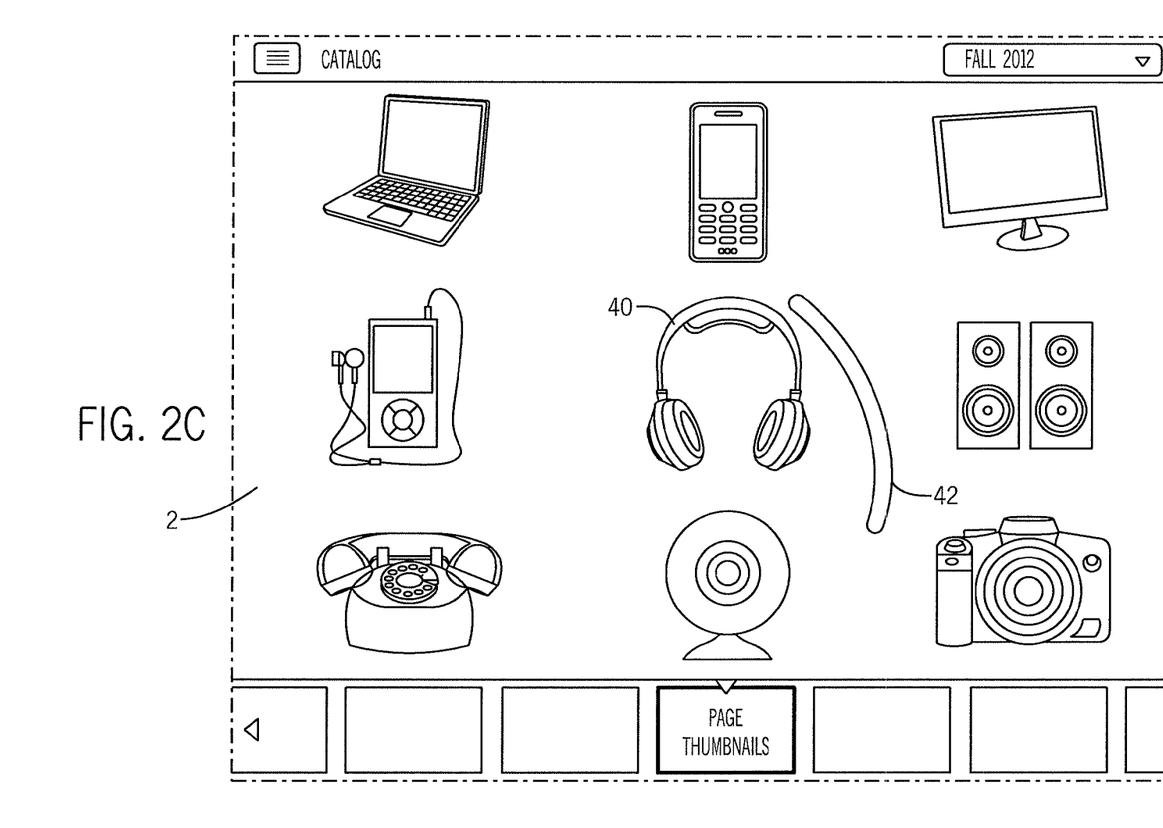
Figure 2D:
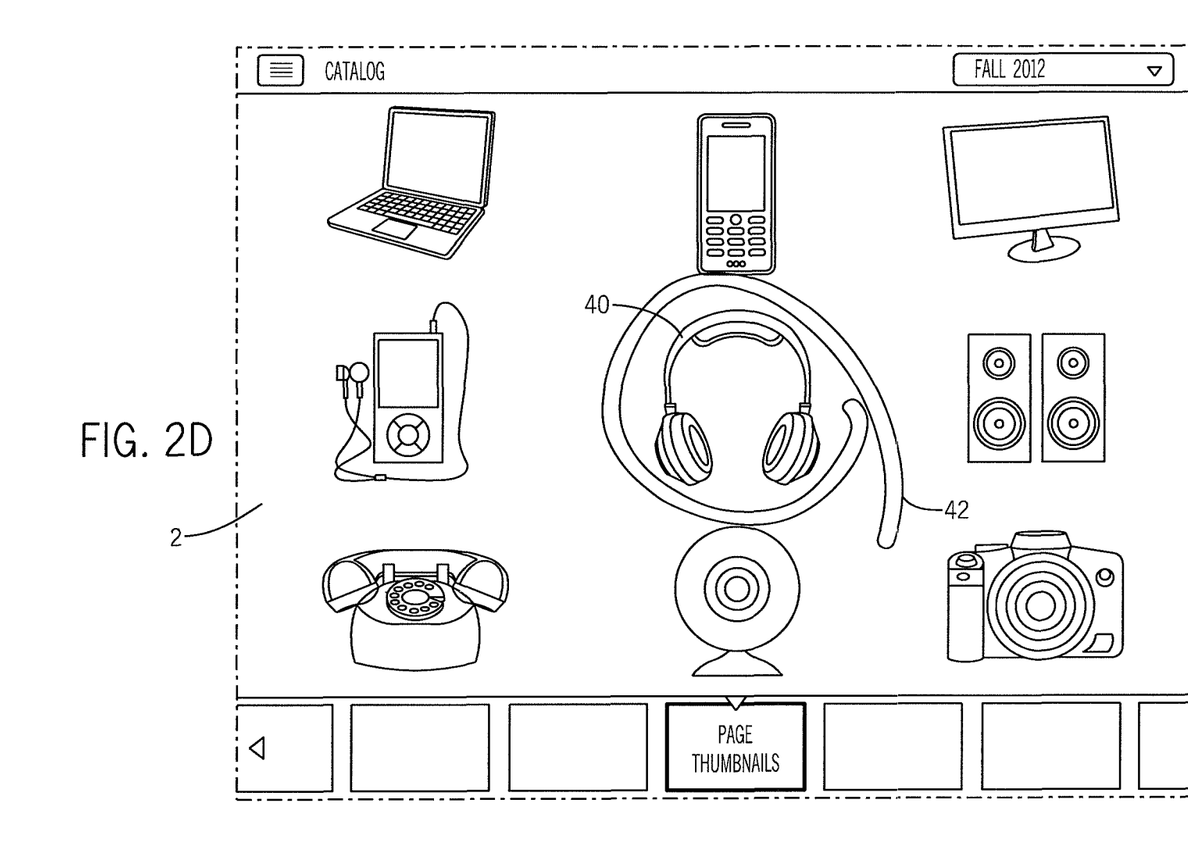
Figure 2E:
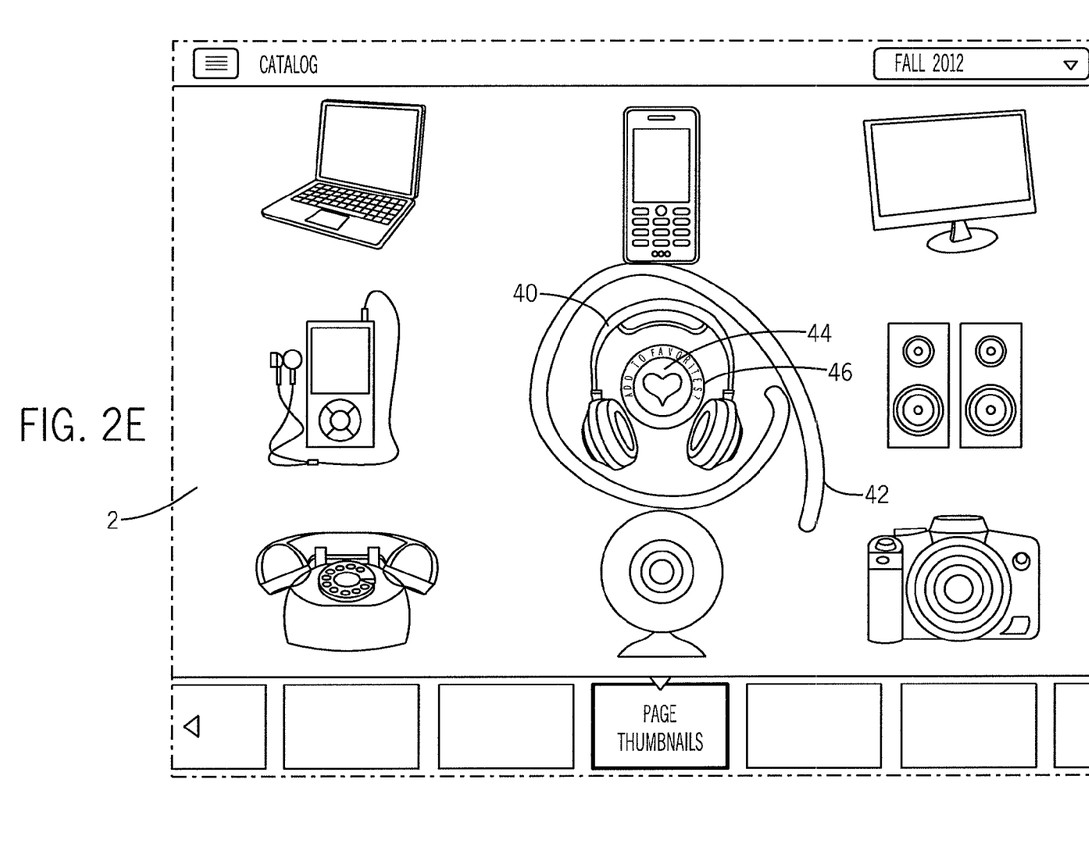
Figure 2F:
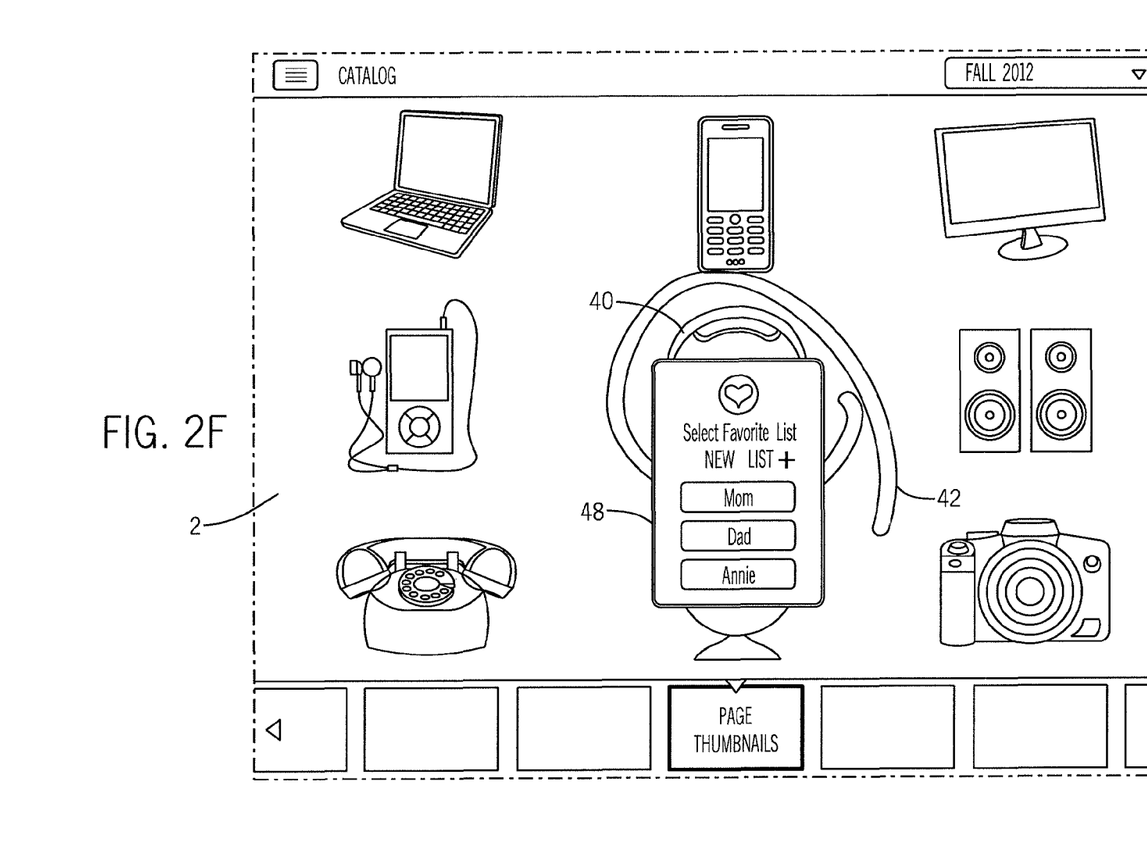

In the preferred embodiment of the present invention, FIGS. 2A through 2F illustrate the "Circle a Product" functionality that is used tactilely with a screen display (2), the screen display (2) being shown in its default view in FIG. 2A. It is to be noted here that this particular functionality effectively translates the age-old activity of circling products in paper catalogs which were used to "flag" a product for the user to come back to at a later time. Again, the screen display (2) illustrates a number of available products for the consumer user but the present application is not limited to the products shown. Referring to FIG. 2B, it shows that when the user initiates a touching of the screen display (2) at a point on the display (2), a portion of a circle (42) will begin to form and appear about the product image (40) shown on the screen display (2). As the user continues to draw the circle (42) with his or her finger around the product (40), the circle (42) begins to fully envelope the image of the product (40). See FIGS. 2C and 2D. This is continued to the point that the product image (40) is completely, or nearly completely, circled. When that happens, a first icon (44) pops up on the screen display (2). See FIG. 2E. As also shown in FIG. 2E, a second icon (46) also appears which queues the user to add the item within the image (40) to his or her "favorites." If the user taps the icons (44, 46), a "list" view (48) is opened. See FIG. 2F. This view (48) can provide the user with the functionality of adding the encircled product to one or more user lists or allow the user to perform other actions relative to the encircled product, and this functionality is not limited to inclusion of the product within a list.

In accordance with the foregoing, it will be seen that there has been provided a new and useful method, system and software product that uses several unique features, or functionalities, as part of an enhanced catalog app. One feature is the "Info Dial UI," which is a degree-based dialing gesture for providing additional information to the user. Closely related to the Info Dial UI concept is the "Circle a Product" feature. This method, system and software product provides the user with prompts and guidance for improving product purchases via mobile encoding technology and personal computing devices.

The details of the invention having been disclosed in accordance with the foregoing, we claim:

1. A computer implemented method for obtaining details and information for a product comprising the steps of:
   electronically providing a user interface featuring a product display page;
   electronically providing a first user interface element for allowing the user to tactilely select a displayed product, the displayed product comprising a product image on the product display page;
   electronically providing a second user interface element for allowing the user to tactilely:
      initiate the appearance of an arc by touching in or around the image of the displayed product, the arc forming a partial circle around the image of the displayed product;
      initiate an indicia point that is tactilely movable by the user along the arc and around the image of the displayed product;
      animate a first circle that visually expands outwardly from the indicia point upon initiation of the indicia point and initiation of the appearance of the arc around the image of the displayed product;

animate a second circle that also visually expands outwardly from the indicia point upon initiation of the indicia point and initiation of the appearance of the arc around the image of the displayed product;

initiate movement of the idicia point along the arc;

animate the first circle to visually fade away as the user tactilely initiates movement of the indicia point along the arc; and animate the second circle to move along the arc with the indicia point centered within the second circle as the user tactilely initiates movement of the indicia point along the arc; and electronically providing a third user interface element for allowing the user to alternatively view more or less information about the selected product as the indicia point is displayed around the image of the displayed product and the said indicia point is tactilely moved around the image of the displayed product and along the arc, the said second circle also moving around the image of the displayed product with the said indicia point which is centered within the said second circle.

2. The computer implemented method of claim 1 wherein the visual appearance of the indicia point is a white dot and the visual appearance of the arc is semi-transparent.

3. The computer implemented method of claim 1 wherein the viewable product information comprises the product name, product details and description, social interaction capabilities and an invitation for the user to add the product to a virtual shopping cart.

4. A computer program product for obtaining details and information relating to a product, the computer program product being embodied in a transitory computer readable medium comprising computer instructions executed by a processor in a computer for:

a computer electronically providing a user interface featuring a product display page;

electronically providing a first user interface element for allowing the user to tactilely select a displayed product, the displayed product comprising a product image on the product display page;

electronically providing a second user interface element for allowing the user to tactilely:

initiate the appearance of an arc by touching in or around the image of the displayed product, the arc forming a partial circle around the image of the displayed product;

initiate the appearance of an indicia that comprises an indicia point that is tactilely movable by the user along the arc and around the image of the displayed product;

animate a first circle that visually expands outwardly from the indicia point upon initiation of the appearance of the indicia point and initiation of the appearance of the arc around the image of the displayed product;

animate a second circle that also visually expands outwardly from the indicia point upon initiation of the appearance of the indicia point and initiation of the appearance of the arc around the image of the displayed product;

initiate movement of the idicia point along the arc;

animate the first circle to visually fade away as the user tactilely initiates movement of the indicia point along the arc; and animate the second circle to move along the arc with the indicia point centered within the second circle as the user tactilely initiates movement of the indicia point along the arc; and electronically providing a third user interface element for allowing the user to alternatively view more or less information about the selected product as the indicia point is displayed around the image of the displayed product and the said indicia point is tactilely moved around the image of the displayed product and along the arc, the said second circle also moving around the image of the displayed product with the said indicia point which is centered within the said second circle.

5. The computer program product of claim 4 wherein the visual appearance of the indicia point is a white dot and the visual appearance of the arc is semi-transparent.

6. The computer program product of claim 4 wherein the viewable product information comprises the product name, product details and description, social interaction capabilities and an invitation for the user to add the product to a virtual shopping cart.

* * * * *